(12) United States Patent  (10) Patent No.: US 8,397,632 B2
Millett et al.  (45) Date of Patent: Mar. 19, 2013

(54) KNOTTER ASSEMBLY

(75) Inventors: Craig V. Millett, Granby, MO (US); J. Scott Giett, Carthage, MO (US); Brian C. Edgar, Burlington, NJ (US)

(73) Assignee: L & P Property Management Company, South Gate, CA (US)

( * ) Notice: Subject to any disclaimer, the term of this patent is extended or adjusted under 35 U.S.C. 154(b) by 5 days.

(21) Appl. No.: 12/717,616

(22) Filed: Mar. 4, 2010

(65) Prior Publication Data

US 2011/0214579 A1 Sep. 8, 2011

(51) Int. Cl.
 *B65B 13/28* (2006.01)
(52) U.S. Cl. ......... 100/31; 100/33 R; 140/93.6; 140/115
(58) Field of Classification Search ................ 100/19 R, 100/20, 21, 22, 23, 26, 29, 30, 31, 33 R; 289/2, 289/6, 13, 14; 140/93.6, 101, 105, 111, 115, 140/118, 119; 56/341, 344
See application file for complete search history.

(56) References Cited

U.S. PATENT DOCUMENTS

| 25,783 | A | 10/1859 | White |
| 1,868,141 | A | 7/1932 | Harvey |
| 2,756,783 | A | 7/1956 | Osuch |
| 2,853,885 | A | 9/1958 | Seltzer |
| 2,859,687 | A | 11/1958 | Hill |
| 2,922,359 | A | 1/1960 | Brouse et al. |
| 2,963,958 | A | 12/1960 | Nelson |
| 3,037,534 | A | 6/1962 | Brouse |
| 3,037,535 | A | 6/1962 | Linehan |
| 3,086,450 | A | 4/1963 | Tarbox |
| 3,099,204 | A | 7/1963 | Erik |
| 3,232,216 | A | 2/1966 | Enstad et al. |
| 3,251,296 | A | 5/1966 | Smith |
| 3,295,436 | A | 1/1967 | Dalton et al. |
| 3,327,618 | A | 6/1967 | Roy |
| 3,447,448 | A | 6/1969 | Pasic |
| 3,880,204 | A | 4/1975 | Sarff et al. |
| 3,889,584 | A | 6/1975 | Wiklund et al. |
| 4,114,527 | A | 9/1978 | O'Neill |
| 4,164,176 | A | 8/1979 | Brouse |
| 4,177,842 | A | 12/1979 | Dilley |
| 4,252,157 | A | 2/1981 | Ohnishi |
| 4,302,991 | A | 12/1981 | Brouse et al. |
| 4,403,542 | A | 9/1983 | Lewis |

(Continued)

FOREIGN PATENT DOCUMENTS

GB 325783 5/1930
GB 417803 A 10/1934

(Continued)

OTHER PUBLICATIONS

PCT International Search Report, PCT/US2011/026856, 2 pages.

(Continued)

*Primary Examiner* — Jimmy T Nguyen
(74) *Attorney, Agent, or Firm* — Shook, Hardy & Bacon L.L.P.

(57) ABSTRACT

The subject invention relates to a knotter assembly for use in a wire-tieing system. The knotter assembly includes a slidably removable twist module assembly, a ratcheted cover arm assembly, and a torque tube assembly having two operating arms that carry all of the operating components for actuating various elements of the knotter assembly.

8 Claims, 13 Drawing Sheets

U.S. PATENT DOCUMENTS

| | | | |
|---|---|---|---|
| 4,566,378 A | | 1/1986 | Fleissner |
| 4,577,554 A | * | 3/1986 | Brouse .................... 100/26 |
| 4,587,791 A | | 5/1986 | Brouse et al. |
| 4,611,534 A | | 9/1986 | Kudlicka |
| 4,655,264 A | | 4/1987 | Dilley |
| 4,730,434 A | | 3/1988 | Knudsen |
| 4,739,700 A | | 4/1988 | Brouse |
| 4,817,519 A | | 4/1989 | Brouse et al. |
| 4,827,991 A | | 5/1989 | Jacobsen et al. |
| 5,433,255 A | | 7/1995 | Wiedel |
| 5,467,804 A | | 11/1995 | Kupferschmidt |
| 5,494,081 A | | 2/1996 | Wiedel |
| 5,704,283 A | | 1/1998 | Wiedel |
| 5,870,950 A | | 2/1999 | Wiedel |
| 6,009,646 A | | 1/2000 | Johnson |
| 6,032,575 A | | 3/2000 | Johnson |
| 6,283,017 B1 | | 9/2001 | Johnson |
| 6,363,843 B1 | | 4/2002 | Daniel et al. |
| 6,571,691 B1 | | 6/2003 | Jones |
| 6,640,700 B2 | | 11/2003 | Helland et al. |
| 6,745,677 B2 | | 6/2004 | Pearson et al. |
| 6,755,123 B2 | | 6/2004 | Flaum et al. |
| 6,857,252 B2 | | 2/2005 | Haberstroh |
| 6,920,741 B2 | | 7/2005 | Devine |
| 6,923,113 B2 | | 8/2005 | Bobren |
| 6,957,835 B2 | | 10/2005 | Rotole |
| 6,962,109 B2 | | 11/2005 | Bobren et al. |
| 6,968,779 B2 | | 11/2005 | Doyle et al. |
| 7,124,679 B2 | | 10/2006 | Daniel et al. |
| 7,373,877 B2 | | 5/2008 | Wiedel |
| 7,380,574 B2 | | 6/2008 | Wiedel |
| 2009/0250930 A1 | | 10/2009 | Eylenbosch et al. |

FOREIGN PATENT DOCUMENTS

| | | |
|---|---|---|
| GB | 420098 A | 11/1934 |
| GB | 474813 A | 11/1937 |
| GB | 704931 A | 3/1954 |
| GB | 984251 A | 2/1965 |

OTHER PUBLICATIONS

Brian Taylor, Fit to be tied: the right wire-tying system conserves costs while keeping bales in ship-shape-Baler Focus, Recycling Today, Feb. 2003. (5 pages).

"Bundling Demand Met by ISB," Converter The International Technical Publication for the Paper, Board, Film and Foil Converter, Jul. 2003, vol. 40, Issue 7, p. 20. (2 pages).

Cranston Machinery Co., Inc., Oak Grove, Oregon, 1000 Series Wire Strapper, 25 pages (Excerpts from Manual). Sep. 1996.

PCT International Publication No. WO 2011/109506 A1, International Publication Date: Sep. 9, 2011, Inventor: Craig V. Millet, et al.

PCT International Search Report, mailed Sep. 4, 2012, in U.S. Appl. No. 12/717,616, 5 pp.

* cited by examiner

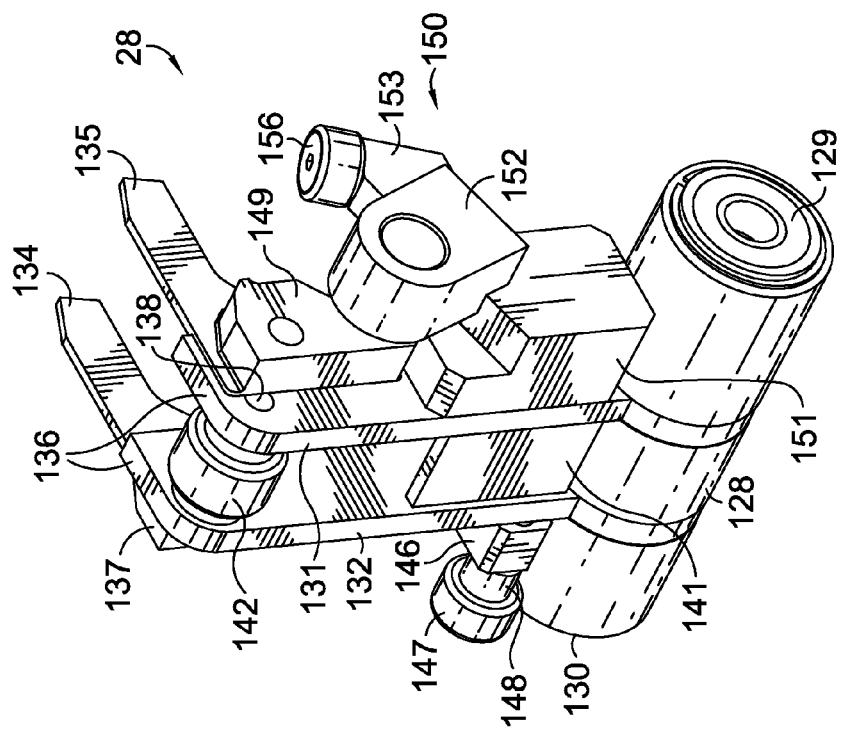
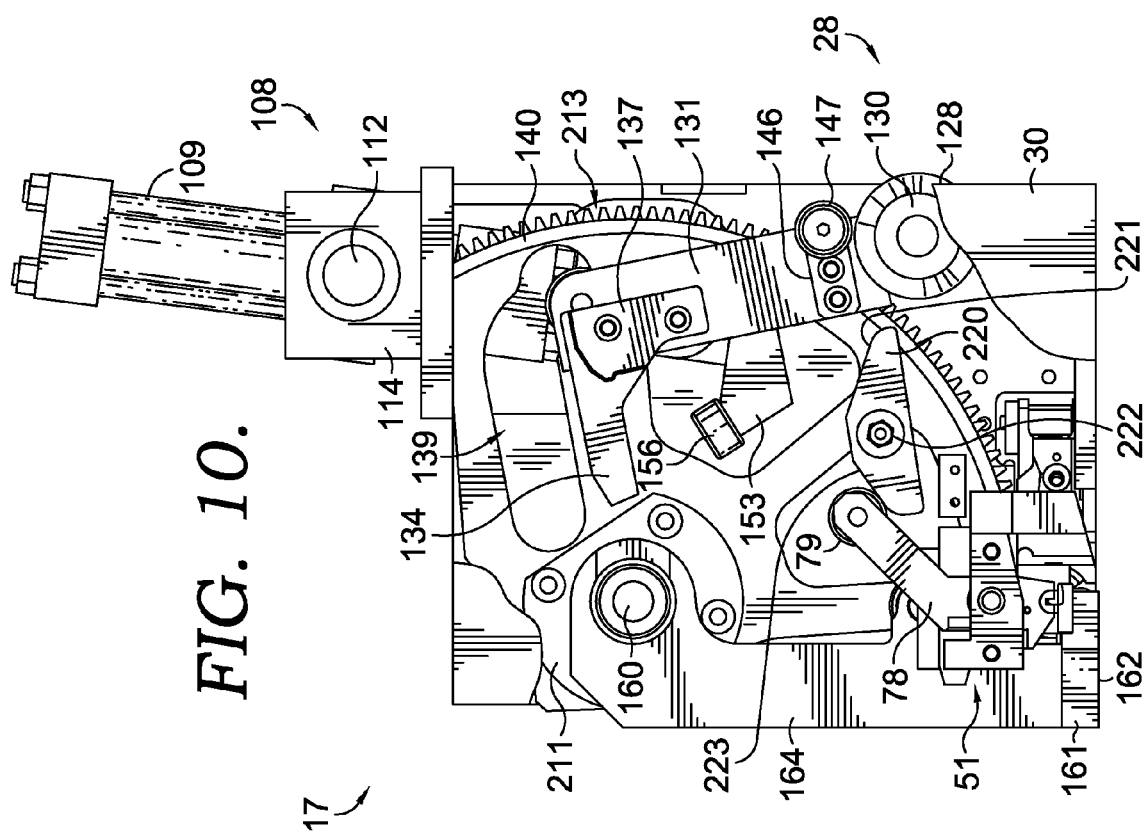
FIG. 11.
FIG. 10.

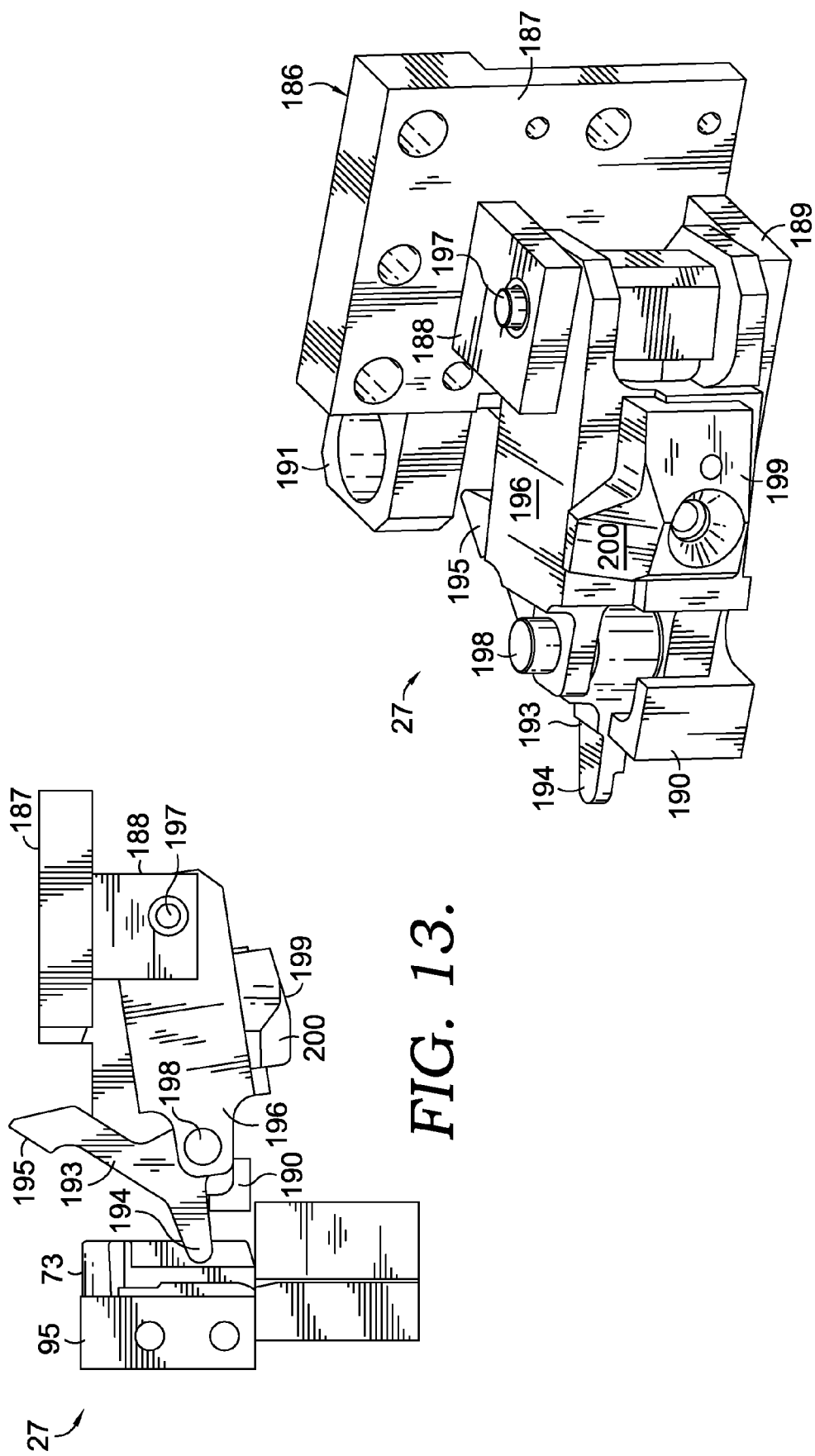

KNOTTER ASSEMBLY

CROSS-REFERENCE TO RELATED APPLICATIONS

None.

BACKGROUND

Various types of bulk materials are shipped, stored, and otherwise processed and distributed in the form of bales. For example, recyclable materials, such as paper, plastic and metal are formed into bales for easier handling. Bulk material such as cotton might also be processed into compressed bales. Formed bales are easier and more efficient to handle than loose bulk material. Furthermore, bales are more organized and take up less storage or shipping space than loose material.

In a baling process, the loose material is collected and formed into a bale. After the bales of material are formed into the proper shape, they are usually wrapped or otherwise fitted with a structure which will keep them in the desired bale shape. For example, it is generally known to wrap bales of compressible material with wire or some other elongated binding device to keep the bales in their form for shipping and storage. Wire is preferable because of its strength, low cost, and the ease with which it is handled.

One method of forming a bale directs the compressible material into an automatic baler where it is pressed into a bale by a ram and then moved by the ram through the baler. At a certain position along the baling path, the bale is tied or bound together with wire. More specifically, a tieing system is used with the baler and guides a continuous wire strand around the bale through a wire-guide track to surround the bale as it progresses through the baler. The wire is overlapped when it completely surrounds the bale. The tieing system engages the bale and the overlapped wire and ties the wire around the bale.

Pneumatic, hydraulic, or electric wire-tieing machines having means for gripping and twisting two wires, or opposite ends of the same wire, together are well-known. In these and similar systems, a knotter assembly associated with the tieing system engages the overlapped wire and twists together the overlapped ends of the wire strands to secure the wire in place around the bale. The knotter assembly utilizes a slotted wire-twister pinion having a central pinion gear. Separate bearing elements and bushings are mounted for supporting and protecting the gear, and wire guides, wire-guide blocks, fingers, cutters, and other parts must be separately installed for knotting and cutting the wire. Such parts are subject to wear and breakage and must be replaced from time to time.

In addition, different sizes of these parts may be required for processing wires of different gauge, so that, again, the parts must be changed. Such changes of parts may require considerable down time whereby the efficiency in the overall wire-tieing operation is reduced. As a result, baling facilities often use the heaviest wire that will be needed for a given manufacturing period on all applications, regardless of whether the application could be done with a lighter wire. Thus, the lack of the ability, in conventional knotter assemblies, to quickly change out the parts discussed above leads to inefficiencies, high wire costs, and the like.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

A wire tieing system in accordance with the principles of the present invention is utilized to wrap and tie a bale of material with wire. The system comprises a wire guide for guiding the wire around a bale of material and a knotter assembly configured for receiving portions of wire in the guide and securing the portions together to tie the wire, and therefore, tie a bale of material. Generally the knotter assembly is mounted at the top or proximate the wire guide. The apparatus is used with a baling device of suitable construction.

Embodiments of the present invention relate to a knotter assembly for use in a wire-tieing system on a baler. In embodiments, the assembly includes a base plate; a pair of parallel opposed side walls; and a set of spacers for supporting a torque tube assembly disposed between the side walls, wherein the torque tube assembly includes a torque tube and a pair of operator members fixably attached to the torque tube, wherein a first operator member includes components for actuating a cutter assembly and a first cover arm, the first cover arm being coupled with a knotter cover. According to some embodiments, the second operator member includes components for actuating a gripper assembly and a second cover arm, the second cover arm being coupled with the knotter cover. In embodiments, a roller cam is rotatably coupled between the two operator members and engages a drive slot in a segment gear such that actuation of the operator members causes the roller cam to drive the segment gear, which, in turn, drives a twister pinion.

Various embodiments of the inventions include a wire-tieing machine for twisting or tieing together end portions of wires. In embodiments, the machine includes a frame assembly, wherein the frame assembly includes a base plate and a pair of parallel opposed side walls, and wherein a first mounting block and a first twist-module guide rail is attached to an inside surface of a first side wall, and further wherein a second mounting block and a second twist-module guide rail is attached to an inside surface of a second side wall. According to an embodiment, the machine also includes a knotter cover arm assembly, wherein the knotter cover arm assembly includes a pair of opposed knotter cover arms coupled, at a lower end of each arm, to a knotter cover, and pivotably coupled, at an upper end of each arm, to a shaft such that rotation of the arms causes the knotter cover to lift away from the wire-tieing machine. In embodiments, the machine also includes a twist module assembly, wherein the twist module assembly includes a main block that houses a twister pinion having a pinion gear, and wherein the twist module assembly is removably coupled to the frame assembly by way of a pair of slots that fit over the respective twist module guide rails.

Embodiments of the inventions include a wire-tieing machine for twisting or tieing together end portions of wires that includes a frame assembly, wherein the frame assembly includes a base plate and a pair of parallel opposed side walls; a knotter cover arm assembly, wherein the knotter cover arm assembly includes a pair of opposed knotter cover arms coupled, at a lower end of each arm, to a knotter cover, and pivotably coupled, at an upper end of each arm, to a shaft such that rotation of the arms causes the knotter cover to lift away from the wire-tieing machine, and further wherein the knotter cover arm assembly includes a ratchet assembly for locking the knotter cover in a lifted-away position; and a twist module assembly, wherein the twist module assembly includes a main block that houses a twister pinion having a pinion gear.

These and other aspects of the invention will become apparent to one of ordinary skill in the art upon a reading of the following description, drawings, and the claims.

BRIEF DESCRIPTION OF THE DRAWINGS

The present invention is described in detail below with reference to the attached drawing figures, wherein:

FIG. 10 depicts a side view, with a side wall removed, of a knotter assembly in accordance with embodiments of the invention;

FIG. 11 depicts a perspective view of a torque tube assembly in accordance with embodiments of the invention;

FIG. 12 depicts a perspective view of a gripper assembly in accordance with embodiments of the invention;

FIG. 13 depicts a top-plan view of a gripper assembly in accordance with embodiments of the invention;

DETAILED DESCRIPTION

Figure 1:
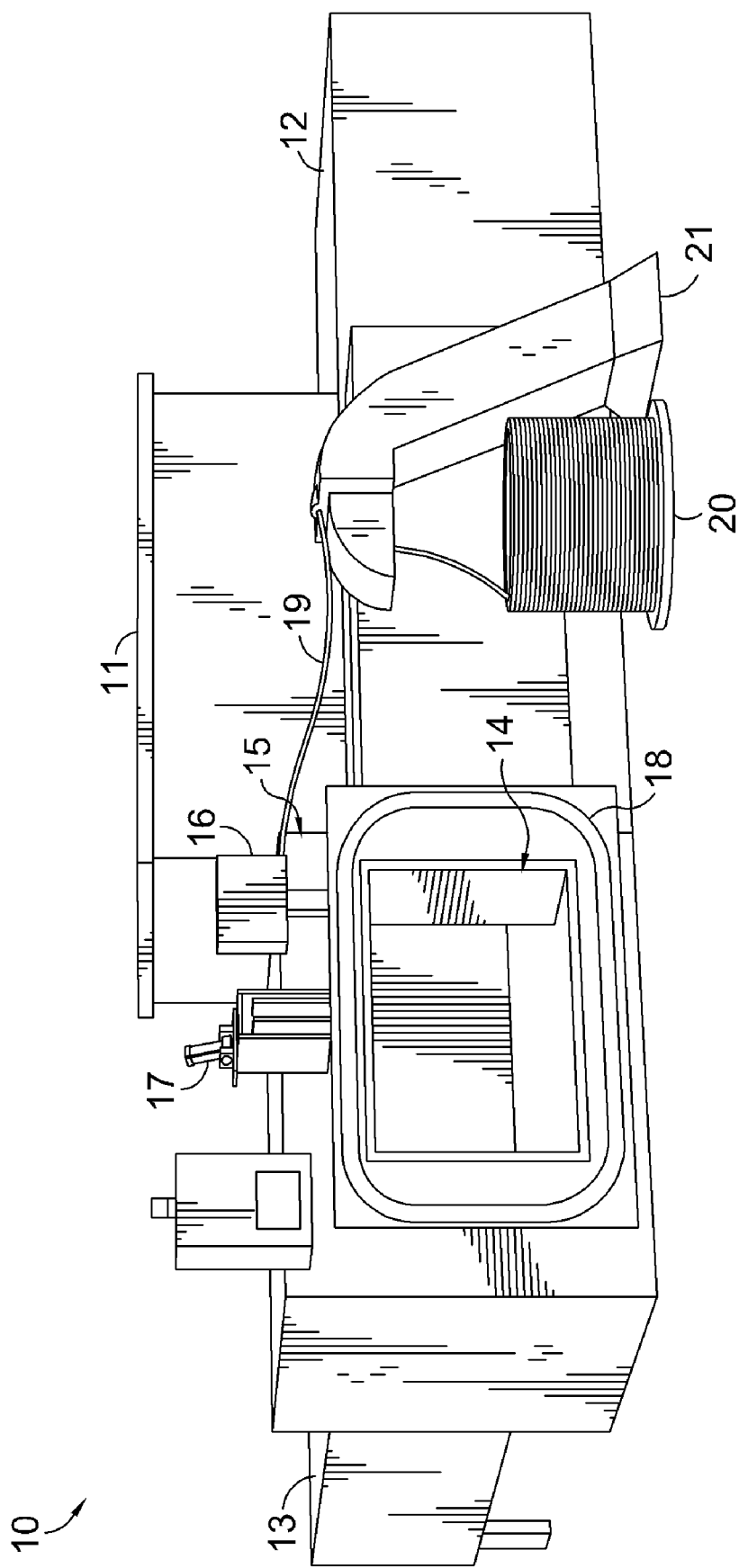
FIG. 1 depicts a perspective view of a two-ram baler with a wire-tieing device in accordance with embodiments of the present invention.

Turning now to the drawings, which are not represented in scale, but rather to clearly show the various embodiments and constructions, FIG. 1 depicts a front perspective view of an exemplary baling machine 10 in accordance with embodiments of the inventions. The baling machine 10 can be a horizontal baler, a vertical baler, a two-ram baler, or any other type of machine used for baling materials. The illustrated baling machine 10 is a two-ram horizontal baler and includes an inlet hopper 11, a first ram 12 for compressing the material, a second ram 13 for ejecting the baled material, a bale outlet 14 and a wire-tieing system 15 disposed around the bale outlet 14. The baling machine 10 can include any number of other assemblies, as well.

As shown in FIG. 1, the wire-tieing system 15 includes a pinch-roll mechanism 16, a knotter assembly 17, and a spring-loaded, separable wire guide track 18 disposed around the bale outlet 14. The pinch-roll mechanism 16 pulls wire 19 from a spool 20. In embodiments, a feed and tensioning structure 21 can be used to ensure that the wire is properly fed around the track 18 under sufficient tension to be engaged by the knotter assembly 17.

In operation, the wire 19 is directed around the track 18, which includes a groove (not shown) such that the leading end of the wire 19 overtakes the trailing end. A bale of material (not shown) is directed into the bale outlet 14, which is encircled by the track 18. The wire 19 encircling the bale is engaged by the knotter assembly 17, which cuts the trailing wire and engages the ends of wires to twist the ends of the wires together for tieing, and for securing the wire around the bale. The system 15 will generally be utilized with a baling structure or baler, and the bale of material is pushed through the outlet 14 by the baler. Exemplary wire-tieing systems of the type depicted in FIG. 1 include the Model 330 and Model 340 Tieing Systems available from L & P Wire-Tie Systems, a Division of Leggett Platt, Incorporated of Carthage, Missouri.

Figure 2A:
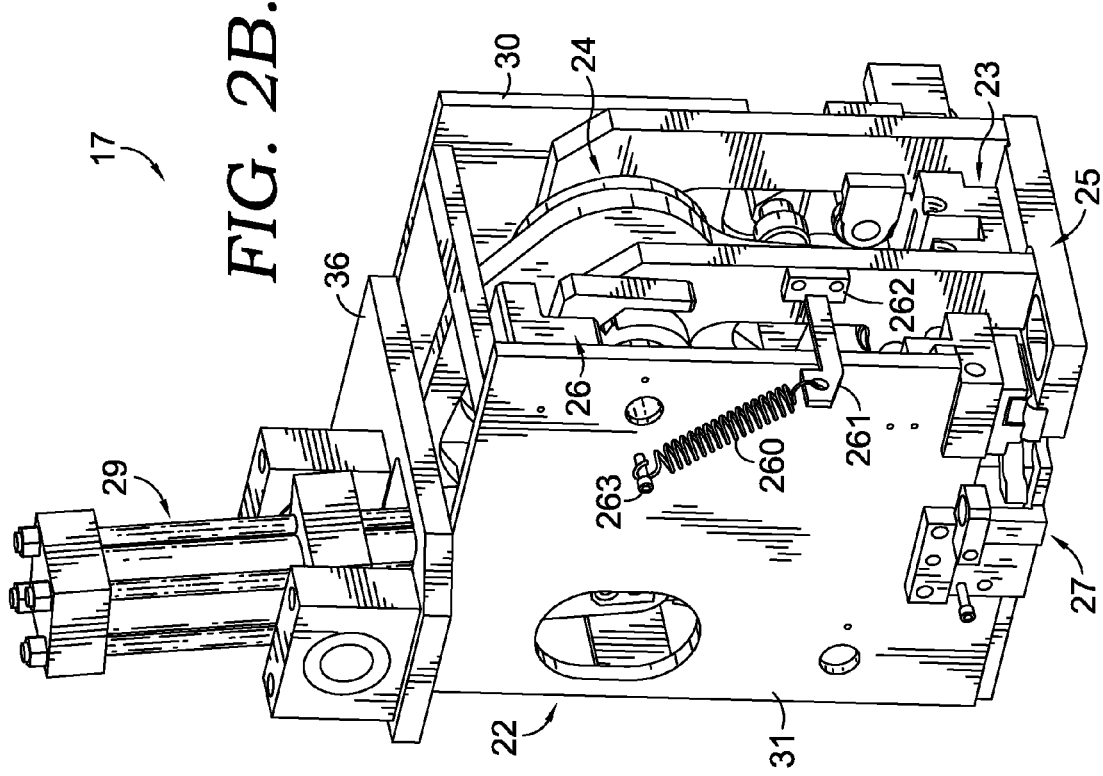
FIGS. 2A and 2B depict perspective views of a knotter assembly in accordance with embodiments of the present invention.
Figure 2B:
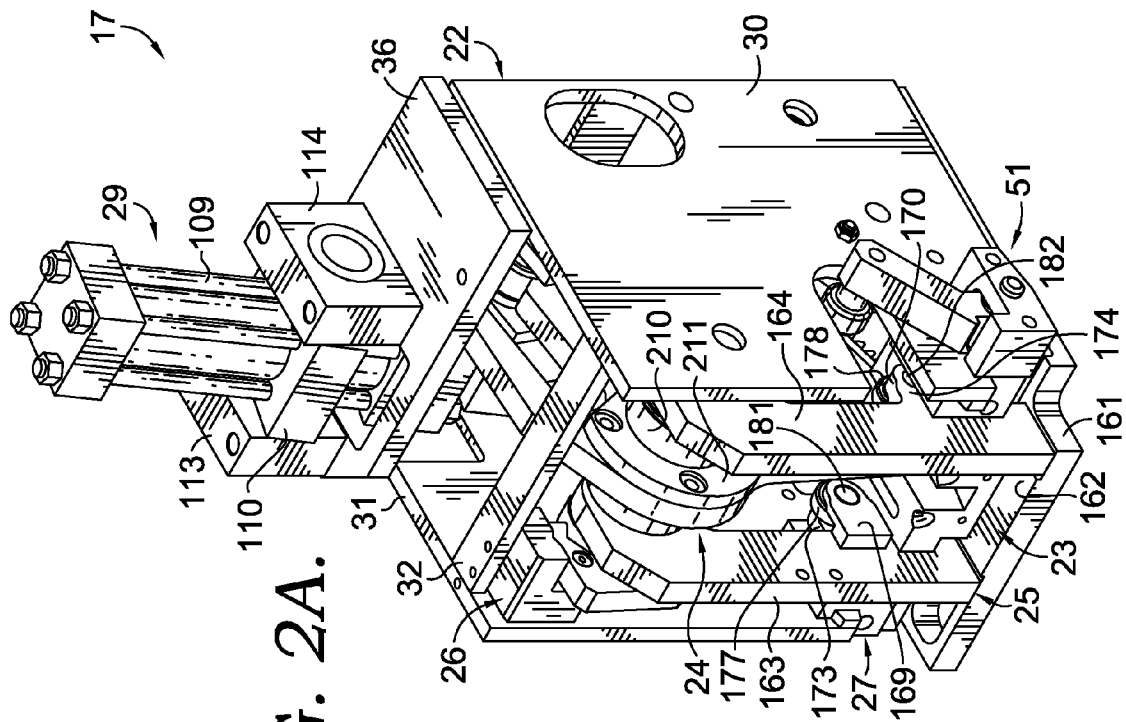
Figure 3:
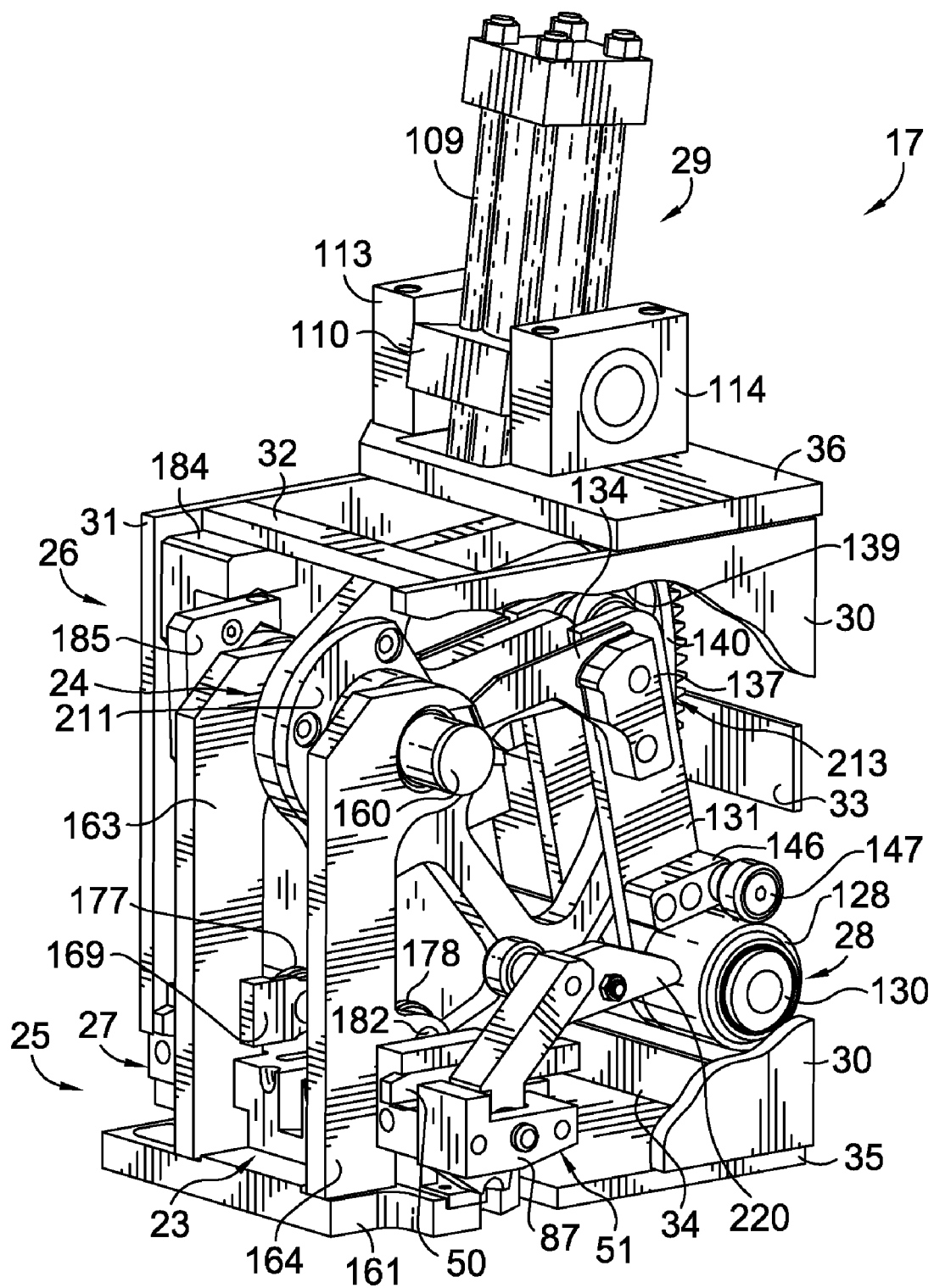
FIG. 3 depicts another perspective view of a knotter assembly, with a side wall cut away, in accordance with embodiments of the present invention.

Turning now to FIGS. 2A, 2B, and 3, perspective views of the knotter assembly 17 are depicted in accordance with embodiments of the inventions. The knotter assembly 17 broadly includes a frame assembly 22, a twist module assembly 23, a segment gear assembly 24, a knotter arm assembly 25, a ratchet assembly 26, a gripper assembly 27, a torque tube assembly 28, and a cylinder assembly 29. In embodiments, the knotter assembly 17 can include other assemblies and parts not illustrated herein.

Figure 5:
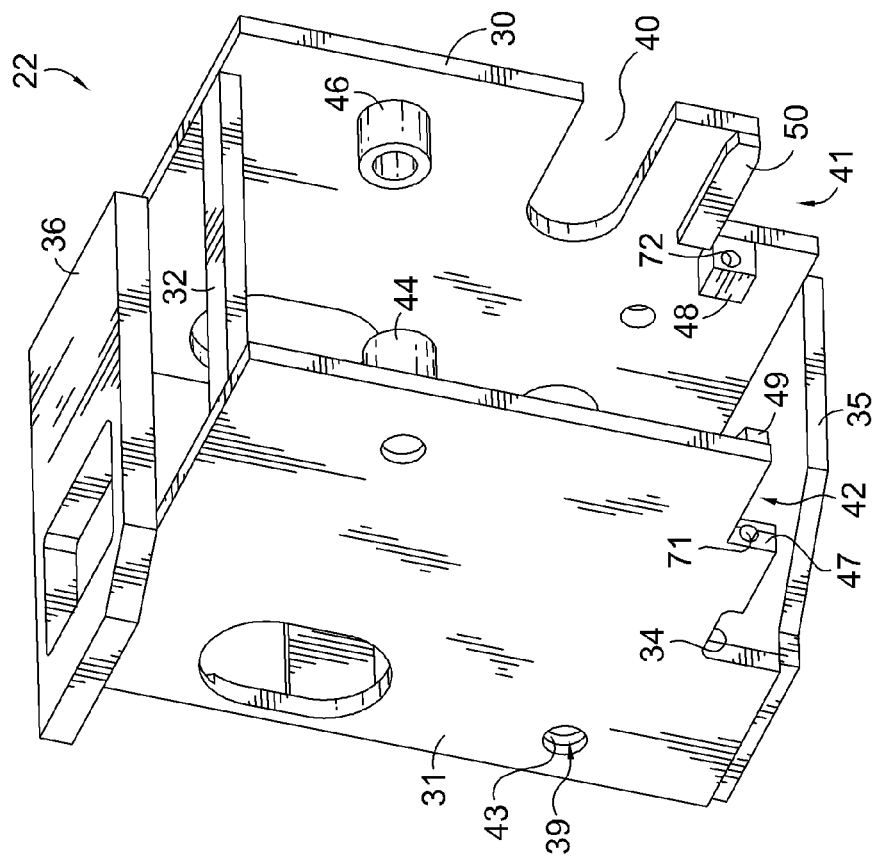
FIG. 5 depicts another perspective view of a frame assembly in accordance with embodiments of the present invention.
Figure 4:
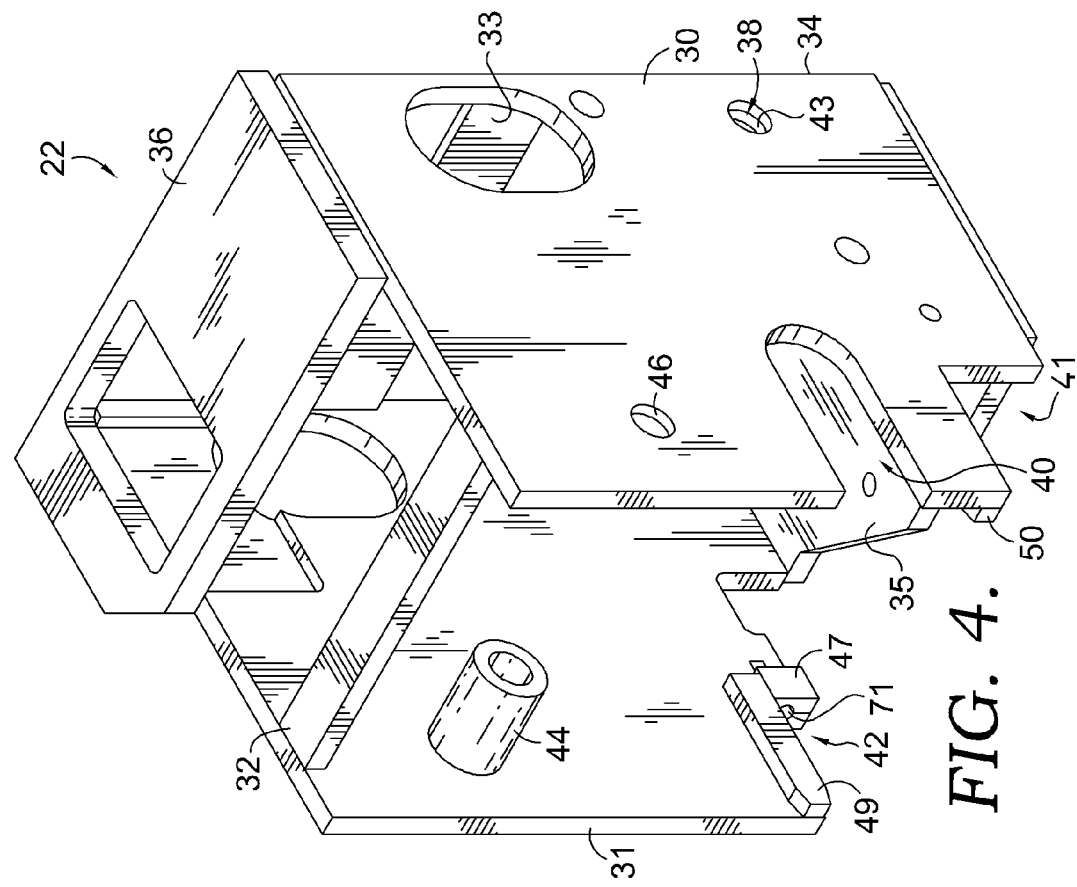
FIG. 4 depicts a perspective view of a frame assembly in accordance with embodiments of the present invention.

As best seen in FIGS. 4 and 5, the frame assembly 22 includes two parallel opposed frame walls: a cutter-side frame wall 30 and a gripper-side frame wall 31. A top brace 32 extends between the tops of the frame walls 30, 31 near the front of the frame assembly 22. Two back braces 33, 34 extend between the two frame walls 30, 31 across the back side of the frame assembly 22. Additionally, the frame assembly 22 includes a base plate 35 and a cylinder mount 36.

The cutter-side frame wall 30 includes an aperture 38 and spacer plug 43 for pivotably coupling one end of a torque tube 128 to the frame assembly 22. Similarly, the gripper-side frame wall 31 includes an aperture 39 and spacer plug 43 for pivotably coupling the other end of the torque tube 128 to the frame assembly 22. Spacer plugs 44, 46 are provided for pivotable attachment of a segment gear bearing housing 210 to the frame assembly 22.

An open slot 40 extends from the front of the cutter-side frame wall 30 to allow for travel of a cutter-lever cam assembly 79. As is further illustrated, two notches 41, 42 are provided in the lower-front portion of the frame walls 30,31, respectively, for allowing removable attachment of the twist module assembly 23 to module mount blocks 47,48 along twist module guide rails 49, 50.

Figure 6:
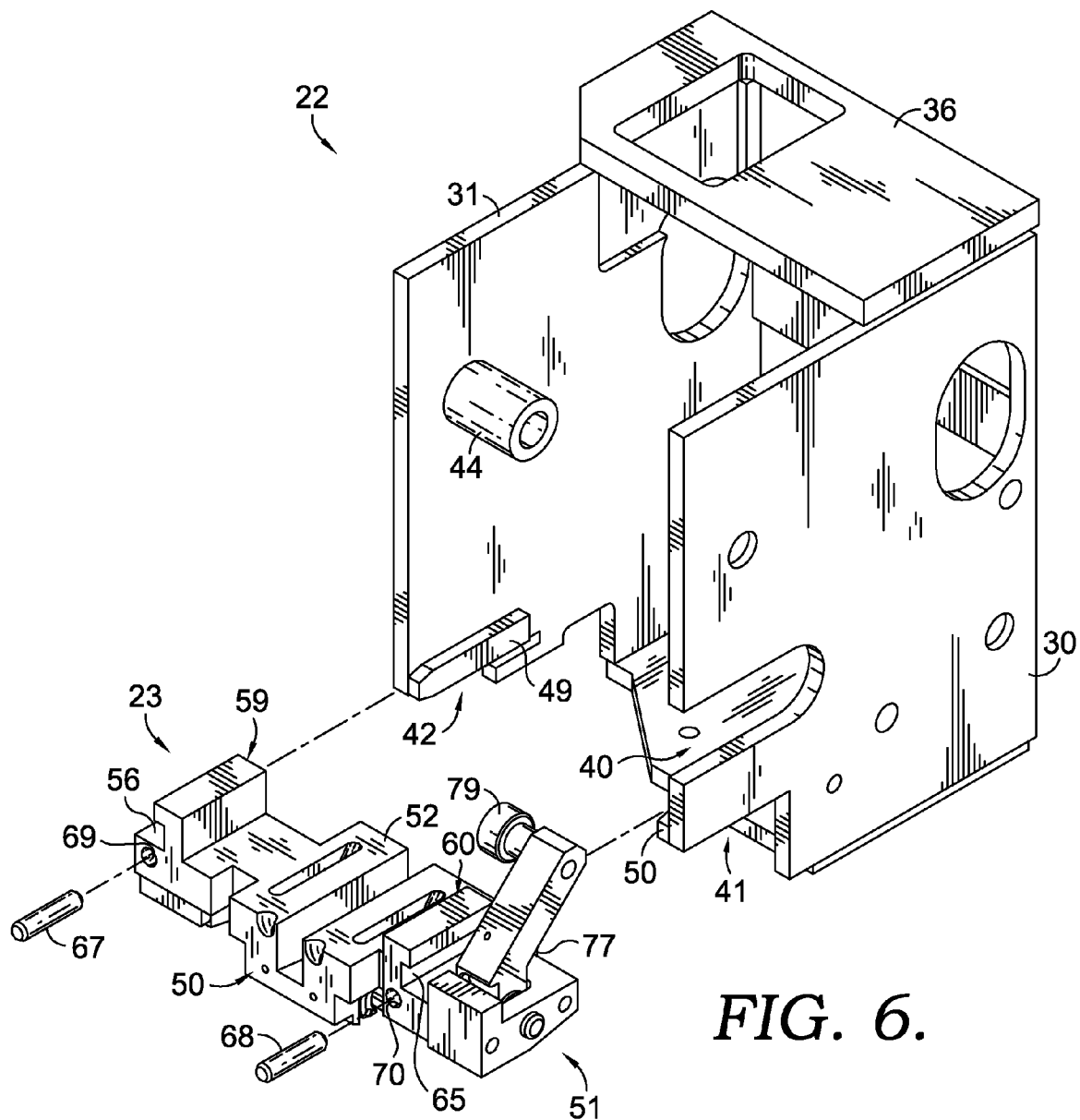
FIG. 6 depicts a perspective view of a frame assembly and a twist module assembly in accordance with embodiments of the present invention.
Figure 7:
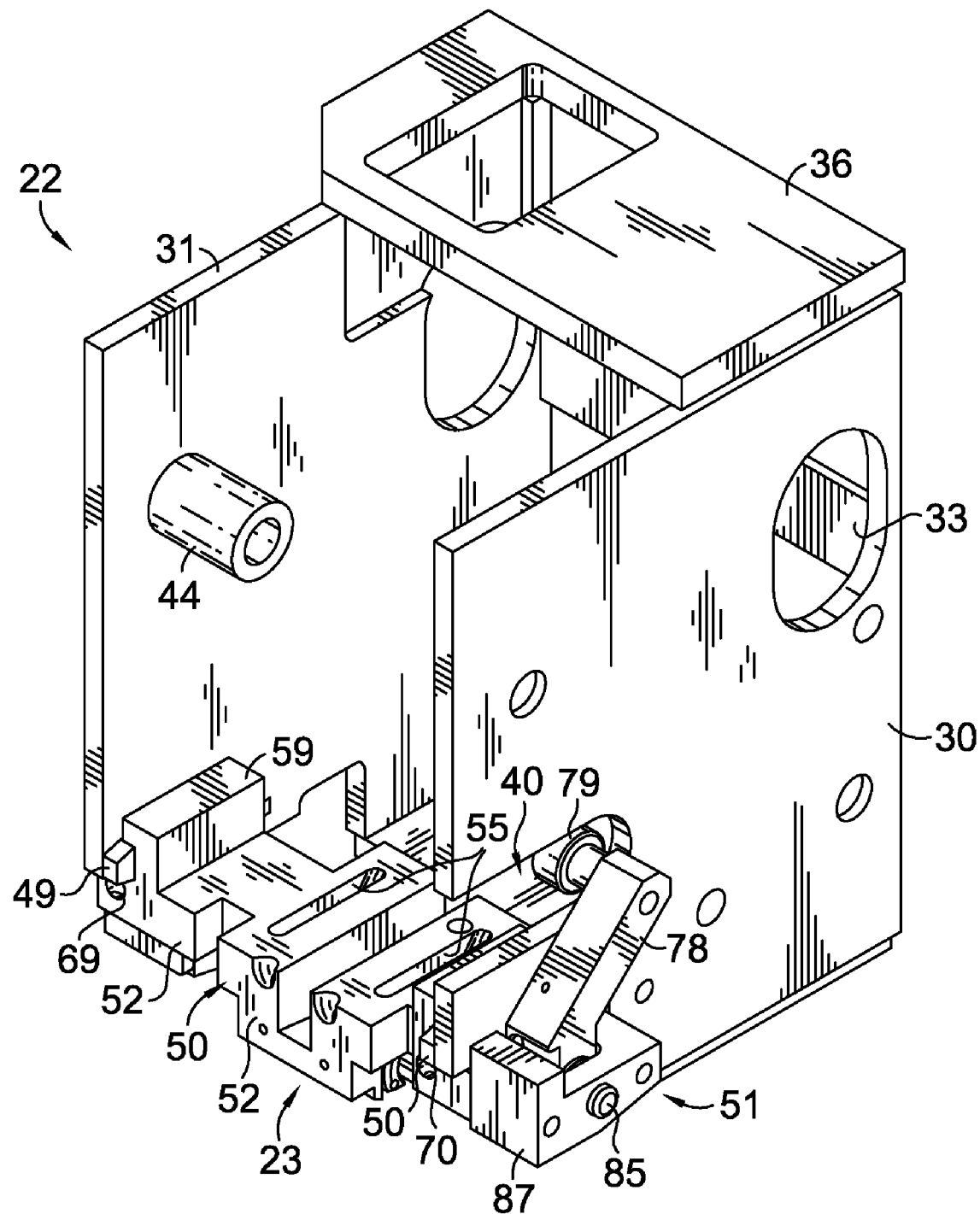
FIG. 7 depicts another perspective view of a frame assembly and a twist module assembly in accordance with embodiments of the present invention.

Turning now to FIGS. 6 and 7, a front perspective view of the frame assembly 22 and the twist module assembly 23 is shown in accordance with embodiments of the inventions. As illustrated and explained further below, the twist module assembly 23 is configured to be removably coupled to the frame assembly 22. The twist module assembly 23 includes a modular housing 52 that is slidably removable from the frame assembly 22. A cutter assembly 51 is attached at a first end of the modular housing 52 (i.e., the cutting side).

Figure 8:
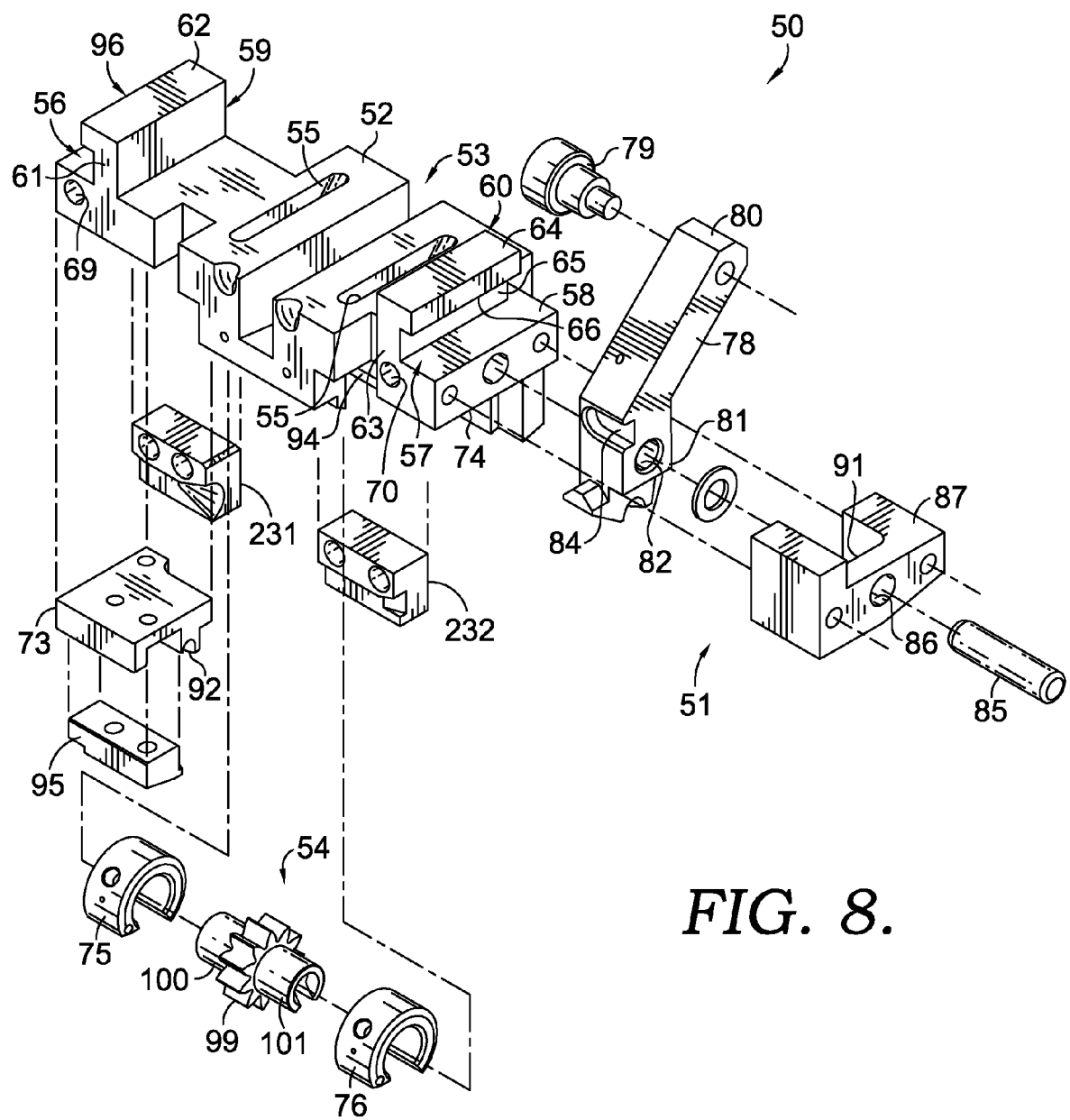
FIG. 8 depicts an exploded perspective view of a twist module assembly in accordance with embodiments of the invention.
Figure 9:
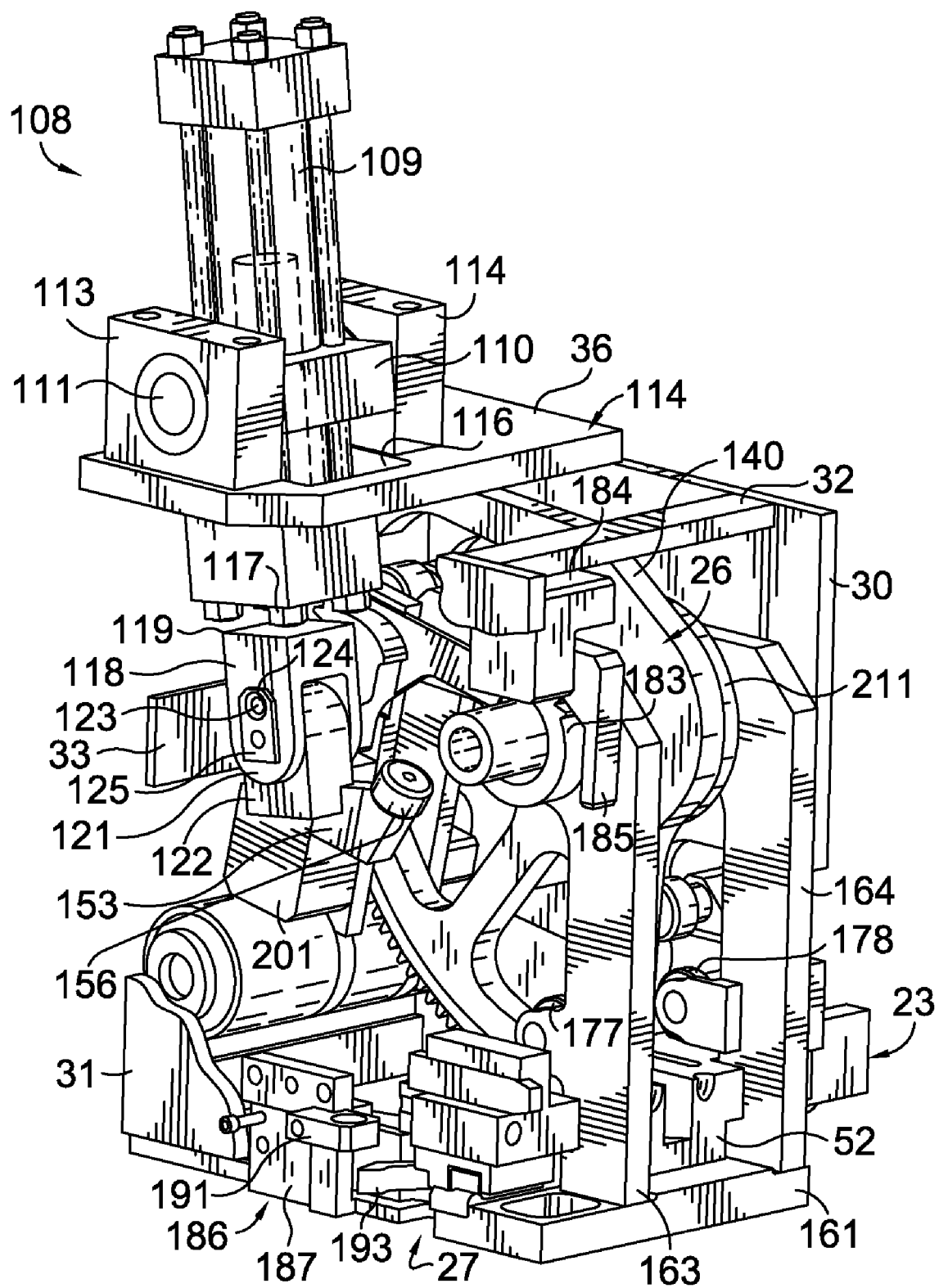
FIG. 9 depicts a partially cut-away perspective view of a knotter assembly in accordance with embodiments of the invention.

As shown in FIGS. 8-9, the modular housing 52 includes a recess 53 in which a twister pinion 54 is disposed. The modular housing 52 further includes an ejector slot 55 disposed on each side of the recess 53 and oriented parallel to the recess 53. As is further shown in FIGS. 6 and 8, the modular housing 52 includes two opposed mounting channels 56, 57. Each mounting channel 56, 57 is a void defined by a top surface 58 of the modular housing 52 (forming the bottom of the channel), and at least one surface of a module-mounting member 59,60. Each module-mounting member 59,60 is, in embodiments, L-shaped and includes a first portion 61,63 extending vertically from the upper surface 58 of the modular housing 52 and a second portion 62,64 extending laterally away from the first portion 61,63 forming channels 56,57, defined by the void between the upper surface 58 of the modular housing 52, the outside surface 65 of the first portion 61,63 of the module-mounting member 59,60 and the lower surface 66 of the second portion 62,64 of the module-mounting member 59,60. According to various embodiments of the inventions, the module-mounting members 59, 60 can be other shapes, as well, so long as the channels 56, 57 formed thereby mate with guide rails 49, 50.

The modular housing 52 is coupled to the frame assembly 22 by sliding the modular housing 52 onto the frame assembly 22. This slidable coupling is achieved by aligning each of the mounting channels 56, 57 with a corresponding guide rail 49, 50 and sliding the module-mounting members 59, 60 onto the respective guide rails 49, 50 such that the guide rails 49,50 occupy the channels 56, 57. The modular housing 52 is temporarily secured into place with two connectors 67, 68 such as, for example, bolts or other coupling devices, that are inserted into bores 69, 70 and pass into threaded bores 71, 72 of mounting blocks 47, 48. In this manner, the modular housing 52 (and thus, the twist module assembly 23) can be easily removed and replaced by removing the two connectors 67, 68 and sliding the modular housing 52 off of the guide rails 49.

Figure 15:
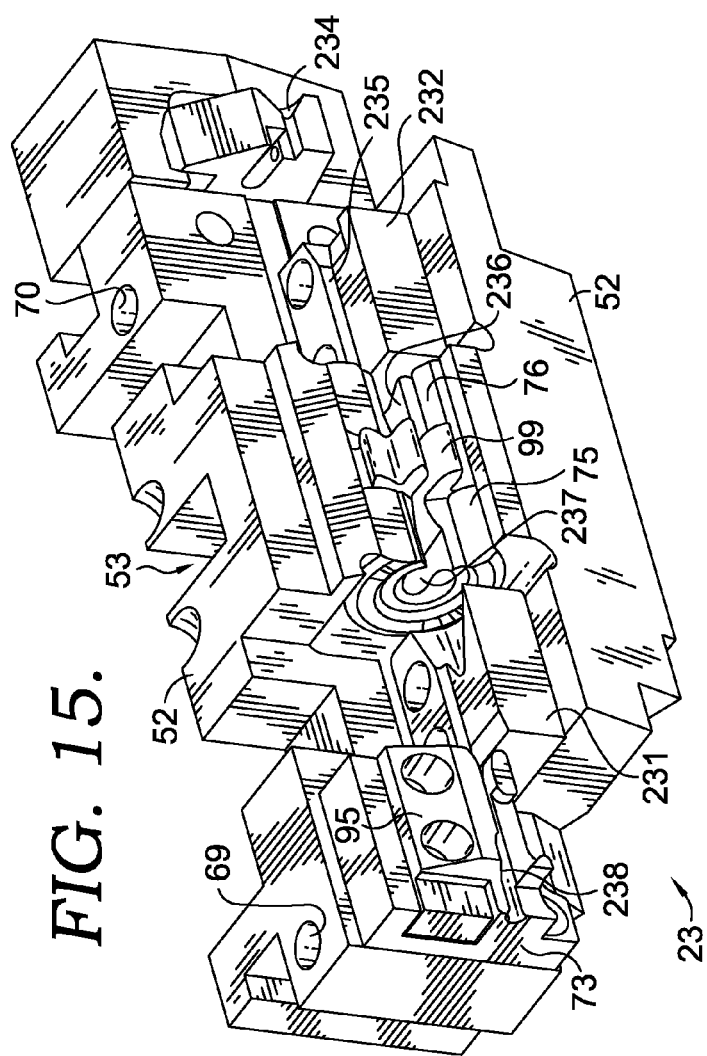
FIG. 15 depicts a perspective view of a twist module assembly, showing wire-guiding and twisting components in accordance with embodiments of the invention.

With particular reference to FIGS. 8 and 15, the twist module assembly 23 further includes wire guides 73, 74 forming wire paths 238 and 235, a gripper side yolk 95, wire guide blocks 231, 232 forming wire paths 236 and 237, a twister pinion 54, and two pinion bushings 75, 76. These components 54, 73, 74, 75, 76, 231, and 232 are known in the art and one having skill in the art will readily appreciate that components such as the components 54, 73, 74, 75, 76, 231, and 232 generally are gauge-specific and subject to wear from normal operation. In conventional knotter assemblies, each of these components 54, 73, 74, 75, 76, 231, and 232 (and, in some cases, additional components) is configured for a particular size (e.g., gauge) of wire. Therefore, in order to change the size of wire being used with conventional balers, each of these components 54, 73, 74, 75, 76, 231, and 232 had to be removed and replaced with similar components manufactured for the desired wire gauge. Moreover, these components tend to wear quickly. To better address these issues, the twist module assembly 23 can be quickly removed from the frame assembly 22 in embodiments of the present invention, and replaced with a new twist module assembly 23 having appropriately sized components, or having new or repaired components.

The cutter assembly 51 is attached to a first end 77 of the main block 52, as shown in FIG. 8. The cutter assembly 51 includes a cutting lever 78 having a laterally extending cam assembly 79 attached to the upper end 80 thereof. The cutting lever 78 is attached to the main block 52 by a pivot pin 85, which passes through a bore 86 in a U-shaped cutter mounting block 87 and through a bore 82 in the lower end 81 of the cutting lever 78 such that the cutting lever 78 pivots about the pivot pin 85. Connecting devices (not shown) such as, for example, bolts or other couplers, extend through bores in the mounting block 87 and into corresponding bores in the main block 52. A spring mechanism (not shown) is seated within the spring-receiving recess 84, at a first end and engages, at a second end, the inner face 91 of the mounting block 87.

As indicated above, the twist module 23 includes a pair of wire guides 73, 74, which are attached to the main block 52 on opposite sides of the twister pinion 54. Each of the wire guides 73, 74 includes an open lower portion 92 that provides a passageway for wires. The twist module assembly 23 also includes a right-hand wire guide block 232 that has a wire passageway. The right-hand wire guide block 232 is attached to the lower surface 94 of the modular housing 52 between the wire guide 73 and the lower end 81 of the cutter lever 78. The twist module assembly 23 also includes a left-hand wire guide block 231, which is attached to the left-hand end 96 of the modular housing 52. The twist pinion 54 includes a pinion gear 99 and support sections 100,101 extending laterally away from the pinion gear 99. The arcuate bushings 75, 76 engage the support sections 100,101 and are coupled to the main block 52 by connecting devices (not shown).

As is best seen in FIGS. 9 and 10, the knotter assembly 17 generally includes a drive assembly 108, which includes a hydraulic cylinder 109. A coupling block 110 is disposed around the cylinder 109. The coupling block 110 includes a pair of cylinder pivot bearings 111,112 that extend laterally away from the coupling block 110 and that are pivotably coupled to a pair of corresponding cylinder mount blocks 113,114. The cylinder mount blocks 113,114 are attached to an upper surface 115 of the frame cylinder mount 36. The cylinder 109 extends through an opening 116 defined within the frame cylinder mount 36 such that the cylinder 109 can pivot relative to the blocks 113,114 and the frame cylinder mount 36. The drive assembly 108 also includes a piston rod 117 slidably disposed partially within the cylinder 109. A clevis 118 is secured, at an upper end 119, to a lower end 120 of the piston rod 117. The clevis 118 is pivotably coupled, near a lower end 121, to a gripper-release bearing block 122 using a clevis pin 123 that passes through apertures 124 on the clevis 118. A clevis pin tab 125 is secured to an outside surface of the gripper-release bearing block 122 for holding the clevis pin 123 in place. The gripper-release bearing block 122 is fixably attached to an upper surface of the gripper-release block 151, which is described in greater detail below.

As illustrated, for example, in FIGS. 9-11, the torque tube assembly 28 includes a torque tube 128 rotatably mounted within the frame assembly 22. A spacer plug 43 is disposed between each end of the torque tube 128 and the inside surface of the corresponding frame side 30, 31. The spacer plugs 43 are coupled to torque tube bearings 129,130, each of which extends into the respective end of the torque tube 128, supporting the torque tube 128 such that the torque tube 128 can rotate about an axis oriented lengthwise through the center of the torque tube 128. In an embodiment, a total of two operating arms 131,132 are fixedly attached to the torque tube 128 in a spaced relationship along the length thereof. The two operating arms 131,132 are mating segment gear and ejector operators.

Two operating arms 131,132 are attached to the torque tube 128, in accordance with embodiments of the inventions: a right-hand operating arm 131 and a left-hand operating arm 132. As seen in FIG. 11, each of the operating arms 131,132 is fixably attached, at a first end thereof, to the torque tube 128 and extends away from the torque tube 128. Each operating arm 131,132 includes a wire ejector finger 134,135 attached at a second end and extending away therefrom in a generally perpendicular direction such that, in operation, the ejector fingers 134, 135 pass through the ejector slots 55 and engage the wire 19 to eject the wire 19 from the knotter assembly 17.

A roller cam 142 is rotatably disposed between the second ends 136 of the operating arms 131, 132. A camroll shaft 138 extends through the roller cam 142 and is affixed, at each end, to an operating arm 131, 132 such that the roller cam 142 rotates about the camroll shaft 138. The roller cam 142 engages an arcuate slot 139 defined within the segment gear 140.

As is further illustrated in FIG. 11, the right-hand operating arm 131 includes a first rocker block 149 attached to the outside surface of the arm 131 and near the second end thereof. Similarly, the left-hand operating arm 132 includes a second rocker block 144 attached to the outside surface of the arm 132 and near the second end thereof. As best seen in FIGS. 2A, 3, and 10, the left-hand operating arm 132 includes a cutter-operating cam mount 146 attached to the outside surface of the arm 132 and near the first end thereof. A cutter-operating cam 147 is rotatably mounted on a cutter-operating cam shaft 148 that extends laterally away from the outside surface of the mount 146. The cutter-operating cam 147 engages a cutter-operator block 220 on a first upward-inclined surface 221 thereof. The cutter-operator block 220 pivots about a bushing 222 such that a second upward-inclined surface 223 engages a cutter-lever cam assembly 79 to cut the wire 19.

As is further illustrated in FIG. 11, the right-hand operating arm 131 includes a gripper-release assembly 150. The gripper-release assembly 150 includes a gripper-release block 151, a gripper-release bearing block 152, and a gripper release operator 153, which is attached, at a first end, to a forward surface of the gripper-release bearing block 152. A gripper release cam 156 is rotatably mounted on a gripper release shaft extending from the second end of the gripper-release operator 153.

Upon extension or retraction of piston rod 117, the entire torque tube assembly 28 is correspondingly pivoted about a rotational axis oriented lengthwise through the center of the torque tube 128. The various operating components carried by the operating arms 131,132 operate, on a sequential basis, the various assemblies described herein for causing the gripping, knotting, cutting and ejecting of a bale wire. This operation will be described in further detail below.

The segment gear assembly 24 is best seen in FIGS. 1, 2, and 10. The segment gear assembly 24 includes a segment-gear bearing housing 210, a segment-gear hub 211, and a segment gear 140. The segment-gear bearing housing 210 houses a segment gear bearing 212. The segment gear assembly 24 includes a segment gear 140 having a toothed face 213 that engages the pinion gear 99. The segment gear 140 further includes an elongated drive slot 139. The segment gear 140 is rotatably coupled to a transverse support shaft 160, which is rotatably coupled at each end to the frame walls 30, 31 such that the support shaft 160 pivots in conjunction with the segment gear 140.

Figure 14:
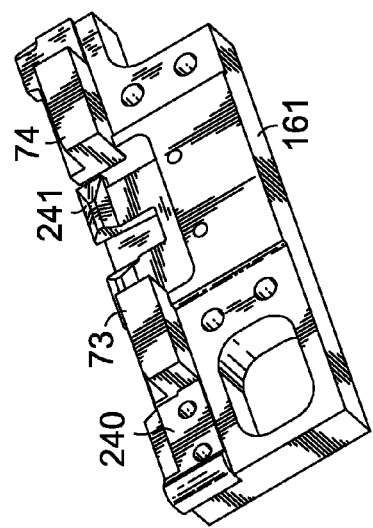
FIG. 14 depicts a perspective view of a cover plate, showing wire-guiding and twisting components in accordance with embodiments of the invention.

As is best seen in FIGS. 2A, 2B, 3, and 10, the knotter arm assembly 25 includes a knotter cover 161 which is generally disposed beneath the knotter assembly 17. The knotter cover 161 includes an apertured plate 162 such as is illustrated in FIG. 9. The knotter cover 161, as shown in FIG. 14, includes a pair of wire guides 73,74, a central finger 241, and a fixed gripper 240. As further illustrated in FIG. 16, when the cover 161 is closed, the elements attached to the cover meet with the elements disposed on the twist module assembly 23 to create an overall wire path 248 defined throughout the various elements. A pair of knotter-cover arms 163, 164 are fixed, at a lower end, to an upper surface of the knotter cover 161 and extend upwardly away from the knotter cover 161. At an upper end, each knotter arm 163, 164 is pivotably coupled to a segment-gear bearing housing 210, which is pivotably coupled, using a pair of spacer plugs 44, 46 to a frame side 30, 31. Each knotter arm 163, 164 has a knotter-arm cam side plate 169, 170 fixably attached to an inside surface 171, 172 of the corresponding knotter arm 163, 164. A protrusion 173, 174 extends laterally away from the rear surface of each knotter arm 163, 164. An operator bearing 177, 178 is disposed between knotter-arm cam side plate 169, 170 and the protrusion 173, 174 on each knotter arm 163, 164 and is rotatably coupled therein by way of an operator bearing shaft 181, 182.

Figure 19:
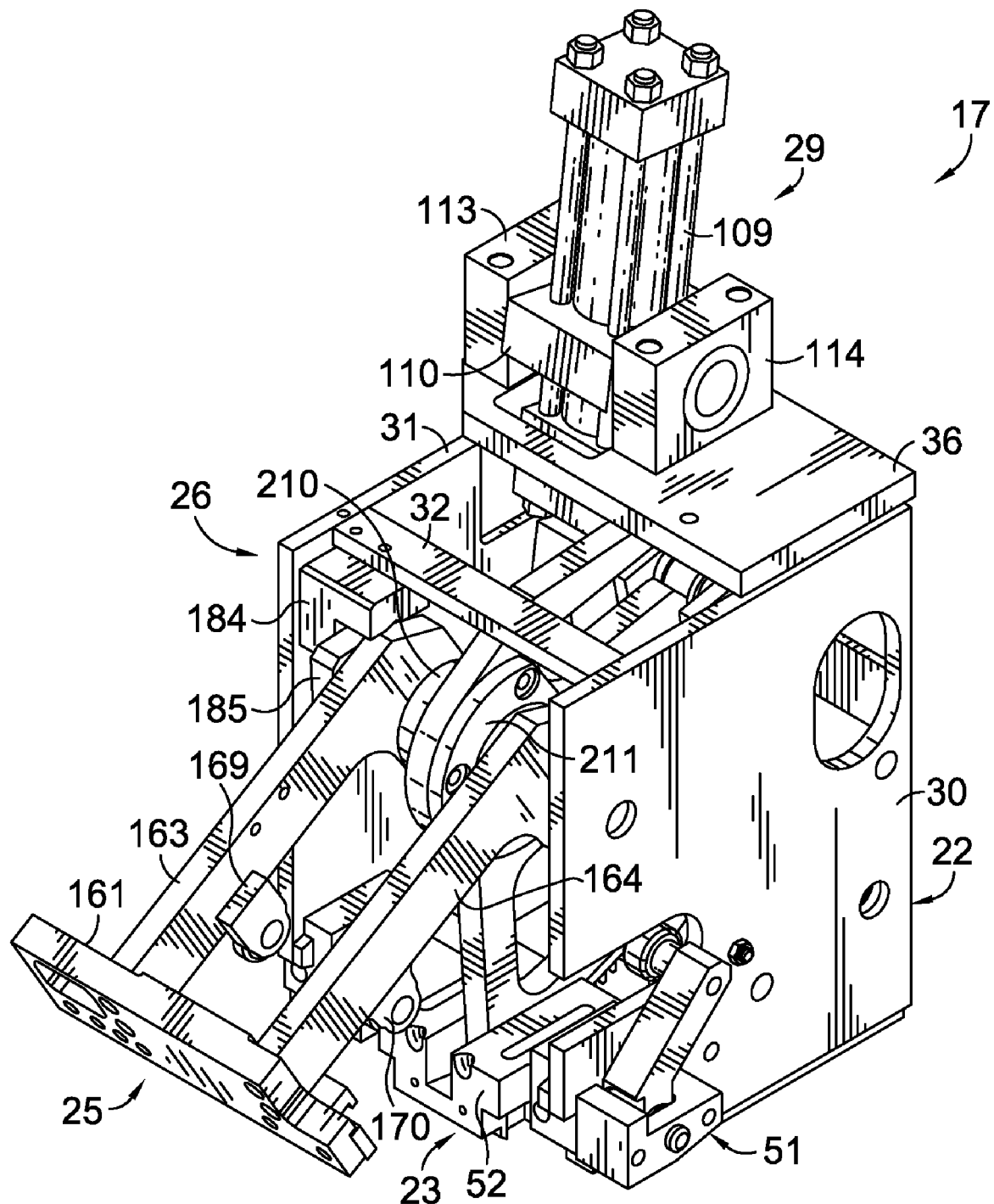
FIG. 19 depicts a perspective view of a knotter assembly with a cover assembly in an open position in accordance with embodiments of the invention.

The left-hand knotter arm 163 includes a ratchet assembly 26 that facilitates opening the knotter cover 161 and locking the knotter cover 161 in an open position such as the position illustrated in FIG. 19 for servicing. Additionally, as illustrated in FIG. 2B, a bias spring 260 biases the cover 161 toward a closed position. As shown, the bias spring 260 extends between a spring connector 261 that extends laterally away from a mount block 262 disposed on the outside surface of the left-hand knotter arm 163 and a stud 263 that is attached to the outside surface of the left-hand frame side wall 31.

Figure 18:
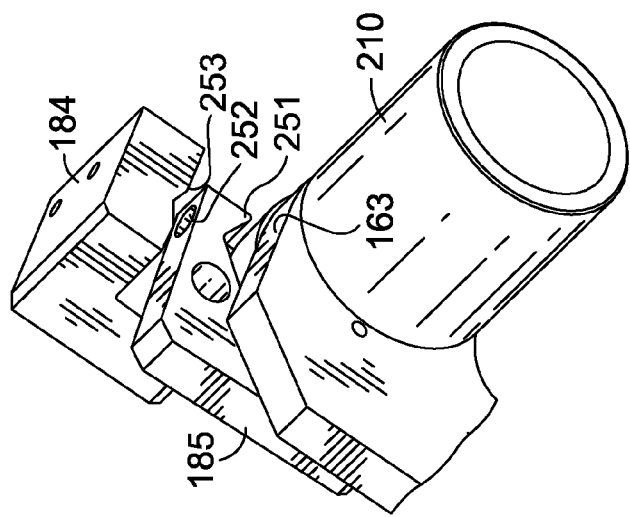
FIG. 18 depicts another perspective view of a ratchet assembly in accordance with embodiments of the invention.
Figure 17:
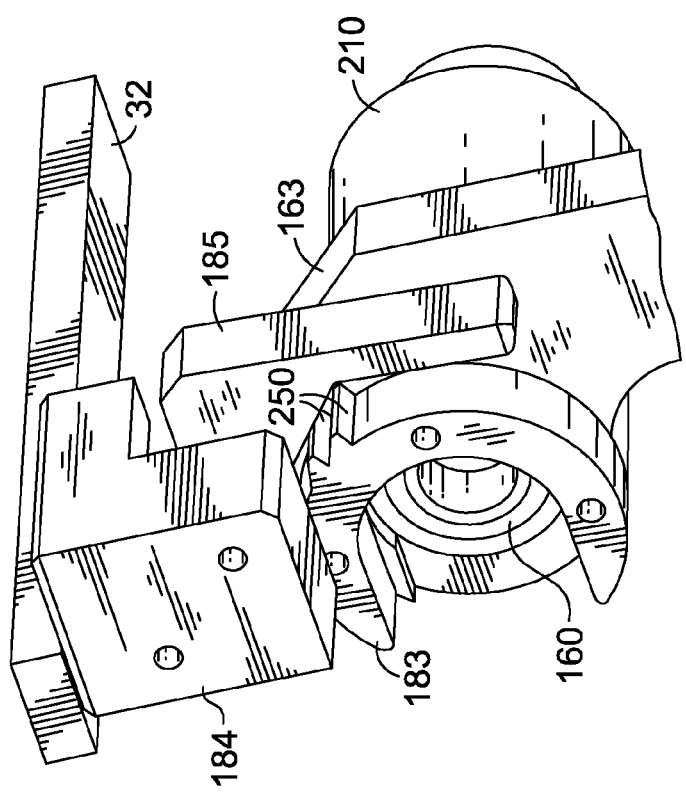
FIG. 17 depicts a perspective view of a ratchet assembly in accordance with embodiments of the invention.

As is best seen in FIGS. 17-19, the ratchet assembly 26 includes a ratchet gear 183 having one or more teeth 250 (e.g., two teeth), a ratchet latch mounting block 184, and a ratchet gear lever 185 having an engagement portion 251. The number of teeth 250 included on the ratchet gear 183 will depend upon the desired number of open positions associated with the knotter cover 161. In an embodiment, the ratchet gear 183 includes two teeth, thereby allowing for two different open positions.

As is best seen in FIG. 18, lever 185 includes a spring recess 252 that receives a spring (not shown, as these are well-known in the art) that extends between the top of the lever 185 and a recess 253 disposed in the underside of the ratchet latch mounting block. The spring causes a downward force on the lever 185, causing the engagement portion 251 of the lever 185 to act as a pawl that engages the teeth 250 on the ratchet gear 183. Thus, in embodiments and as depicted in FIG. 19, a user can lift the knotter cover 161 to a first or second open position. The operation described above of the ratchet assembly 26 locks the cover 161 in the selected position. In this manner, the user can service parts of the knotter assembly 17 such as, for example, by removing the twist module assembly 23 from the frame assembly 22 and replacing it with another twist module assembly 23 having new or repaired parts or parts designed for tieing wire of a different gauge.

The gripper assembly 27 is illustrated in FIGS. 9, 12, and 13. The gripper assembly 27 includes a connector 186. The connector 186 includes an upright plate 187. An upper aperture tab 188 and an opposed lower aperture tab 189 extend laterally away from the upright plate 187. A stop block 190 is fixably attached to the lower aperture tab 189. The upright plate 187 further includes a pair of spring recesses that receive a pair of coil springs, both of which are well-known in the prior art and, therefore, are not illustrated herein. The plate 187 is attached to the outside surface of frame side wall 31.

The gripper assembly 27 also includes a generally dogleg-shaped, wire-engaging member 193. The wire-engaging member 193 includes a wire-engaging end 194 and an actuator end 195. The wire-engaging member 193 is pivotably attached to a pivotal block 196 that is pivotably attached to the connector 186 by way of a pair of connection pins 197,198. An operator segment 199 is secured to an outside surface of the block 193 and includes an inclined operating surface 200. The pivotal block 196 houses a spring assembly (not shown), as is known in the art. Additionally, those having skill in the art will appreciate that a biasing spring (not shown) may extend between the block 196 and the wire-engaging member 193 and that coil springs (not shown) may extend between the plate 187 and the block 196.

A sensor mounting block 191 is attached to an outside surface of the upright plate 187 and is configured for housing a sensor (not shown) that detects when the actuator end 195 of the wire-engaging member 193 moves to a position near the sensor due to the wire being in a grippable position so that the system can begin the process of reversing the feed direction of the wire to tension it, as is known in the prior art. Additionally, those having skill in the art will recognize that an extendable cylinder (not shown) may be attached to the outside of the upright plate 187 and aligned such that, when the cylinder is extended, the cylinder engages the actuator end 195 of the wire-engaging member 193 and pushes the actuator member 195 away from the cylinder, thereby causing the wire-engaging member 193 to pivot in a counter-clockwise direction, gripping the wire.

An exemplary operation of baler 10 is described below. Initially, the wire 19 is manually fed through guides (not shown), and jogged around the bale via the track 18 using the pinch-roll mechanism 16 to slowly advance the wire 19, and into the gripper assembly 27, which grips the wire 19, to a "home" position such that the sensor associated with the gripper (discussed above, but not illustrated as it is well-known in the prior art) activates. Activation of the sensor communicates to the baler or an operator that the system 15 is ready to tie a bale. When a bale is properly positioned relative to the outlet 14 such that the wire-tieing system 15 is aligned with a first wire-tie position associated with the bale, the system 15 receives a manual or electronic input to initiate tieing. Upon receiving an input from the baler or operator, the gripper assembly's 27 grip on the wire 19 is tightened, the wire 19 is tensioned around the bale by a reverse action of the pinch-roller mechanism 16 that feeds wire into an accumulation area (not shown, as it is taught in the prior art) inside the feed and tensioning structure 21, and a twist knot is completed. Upon ejection, the wire 19 is automatically re-fed through the guides and track 18 to the gripped home position, activating the sensor to indicate that the system 15 is ready to tie. The operator or the baling machine 10 indexes the bale to a second (e.g., next) wire-tie location. As the system repeats itself from a ready status, a sensor (not shown) associated with the outlet 14 sends an initiation signal to wire-tieing system 15.

To prepare a wire 19 such that the system is in a home position, the pinch-roll mechanism 16 is actuated via a drive motor (not shown) to advance the wire 19, drawing wire 19 from the spool 20. The pinch-roll mechanism 16 advances the wire 19 through the knotter assembly 17, and around the guide track 18 until the leading end of the wire 19 passes underneath the wire 19 section already disposed within the knotter assembly 17.

The pinch-roll mechanism 16 continues advancing the wire 19 until the leading edge thereof passes and engages the wire-engaging end 194 of the wire-engaging member 193 of the gripper assembly 27. As a result, the wire-engaging member 193 slightly pivots in a clockwise direction. The wire-engaging end 194 engages the wire 19 and the actuator end 195 is located beneath the sensor (not shown). The sensor detects the presence of the actuator end 195 and causes a signal to be sent to the pinch-roll mechanism 16 to stop advancing the wire 19. The system 15 and wire 19 are now in a home, or ready, position.

Upon receiving a signal to tie, the pinch-roll mechanism 16 begins to reverse the advancement of the wire 19. This reverse advancement tensions the wire 19 around the track 18. As a result of its engagement with the wire 19, the wire-engaging member 193 pivots in a counter-clockwise direction until the wire-engaging member 193 encounters stop block 190. The pinch-roll mechanism 16 continues the reverse advancement of the wire 19 to tighten the gripping engagement that the wire-engaging end 194 of the wire-engaging member 193 has with the wire 19. To ensure that the wire is gripped tightly enough for cutting, a cylinder (not shown) may be actuated, which engages the actuator end 195 of the wire-engaging member 193 and causes further counter-clockwise pivoting of the wire-engaging member 193.

The drive assembly 108 is actuated to twist-knot the wire 19, to cut the wire 19, and to eject the knotted wire from the knotter assembly 17. In embodiments, the cylinder 109 and piston rod 117 mechanism is actuated, thereby causing the cylinder 109 to pivot relative to the mounting blocks 113, 114 and the frame cylinder mount 36. As a result, the clevis 118 causes the gripper-release bearing block 122 and gripper release block 151 to rotate, thereby rotating the torque tube assembly 28. In response to this rotation, the roller cam 137 rides within the drive slot 139, causing the segment gear 140 to pivot, thereby causing rotation of the pinion gear 99. The rotation of the pinion gear 99 causes the two portions of the wire 19 to be twisted together. In embodiments, for example, the portions of the wire 19 are twisted through four turns, while in other embodiments, the portions are twisted through three and one-quarter turns or some other number of turns.

After the wire 19 is twisted, the cutter lever 78 is actuated by engagement of block 220 with the cam 79 secured to the upper end 80 of the cutter lever 78, causing the cutter lever 78 to rock about the pivot pin 85, shearing the wire 19.

Figure 16:
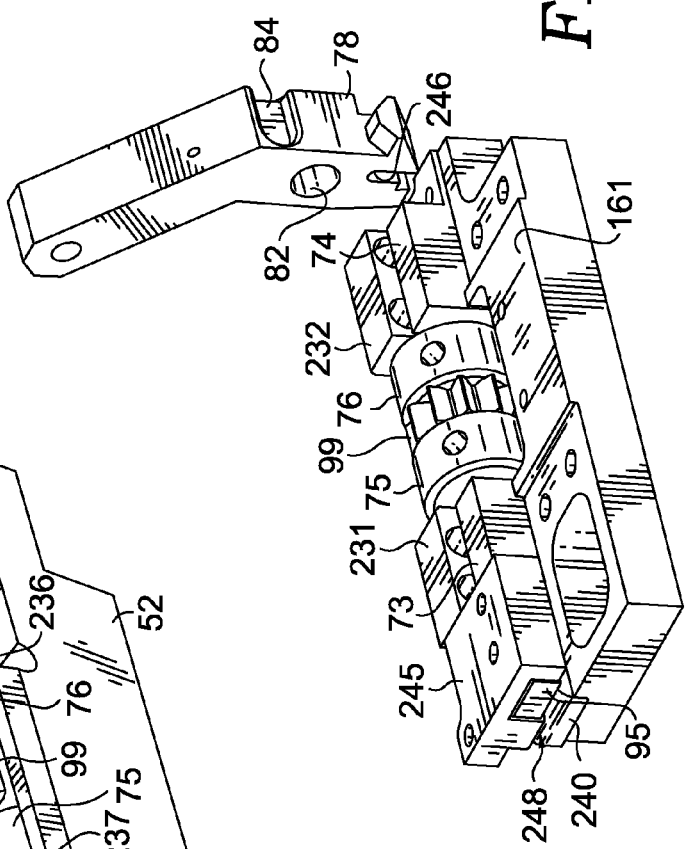
FIG. 16 depicts a perspective view of the mated wire-guiding and twisting components of a cover plate and a twist module assembly in accordance with embodiments of the invention.

Next, the gripper release block 151 is pivoted to cause its engagement with the operating surface 200 of the operator segment 199. As a result of this engagement, the pivotal block 196 is pivoted over center, releasing the wire 19 from the wire-engaging member 193. The knotter cover 161 is moved slightly upwardly to allow ejection of the wire 19. As illustrated in FIGS. 14-16, the slight upward movement of the knotter cover 161 is occurs as a result of the interaction of the rocker blocks 142,144 carried by the operating arms 131,132 with the operator bearings 177,178 carried by the knotter-cover arms 163,164. Additionally, the ejector fingers 134,135 pass through the slots 55 to engage and eject the wire 19.

The device 10 is then returned to a ready position by actuation of the cylinder 109 and piston rod 117 mechanism to retract the piston rod 117 within the cylinder 109. As a result, the segment gear 140 and the components of the torque tube assembly 28 return to their original positions. The knotter cover 161 returns to its original position under the influence of gravity and additional assistance from the bias spring 260, which biases the cover 161 inwardly toward the frame assembly 22. The gripper assembly 27 also returns to its original position.

According to embodiments of the invention, the knotter cover 161 can be readily shifted to allow removal of the twist module assembly 23. In embodiments, a user lifts up on the knotter cover 161 through an arc of about sixty degrees. In some embodiments, the arc may include less than sixty degrees, while in other embodiments, the arc may include more than sixty degrees. The ratchet assembly 26 causes the knotter cover 161 to lock in place at one or more open positions. To lower the cover, the ratchet gear lever 185 is depressed to release the pawl on 185 from the ratchet gear 183 and the cover is lowered.

Moreover, because the twist module assembly 23 is removably coupled to the frame assembly 22, it is relatively simple to remove the connectors 67,68 and slide the twist module assembly 23 off of the frame assembly 22. Once the twist module assembly 23 is removed, a new twist module assembly 23 (or, e.g., a twist module assembly with previously repaired parts) can be installed onto the frame assembly 22. In this manner, components of the twist module assembly 23 can be rapidly replaced when they wear, while minimizing machine 10 down-time. Additionally, this modular operation allows for rapidly switching the gauge of wire that is being used for baling.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A knotter assembly in a wire-tying system of a baler, the assembly comprising:
   a base plate;
   a pair of parallel opposed side walls each having a first edge, the first edges together defining a first side of the knotter assembly;
   a guide mechanism on each side wall and extending inwardly therefrom, said guide mechanism having a planar top surface;
   a torque tube assembly disposed between the side walls, the torque tube assembly including a torque tube, a cutter-assembly-actuating component fixably associated with the torque tube, a gripper-assembly-actuating component fixably associated with the torque tube, and a first and second operator member fixably attached to the torque tube, the first operator member including components for actuating-a first cover arm, the first cover arm being coupled with a knotter cover, and the second operator member including components for actuating a second cover arm, the second cover arm being coupled with the knotter cover, the first and second operator members actuating the first and second cover arms to cause the first and second cover arms and the knotter cover to at least partially extend from the first side of the knotter assembly; and
   a twist-module assembly that is removable as a unit via the first side of the knotter assembly, the twist-module assembly including a modular housing having spaced-apart guide structures, each having a channel that matingly slides over a corresponding guide mechanism along said top surface to guide said housing into and out of said side walls; said housing having the cutter assembly, a twister pinion, pair of pinion bushings, and a pair of wire guides removeably mounted to the modular housing.

2. The knotter assembly of claim 1, wherein the twist-module assembly is removable as a unit using said guide mechanisms and said guide structure.

3. The knotter assembly of claim 2, wherein replacing the twist-module assembly as a unit provides operation of the knotter assembly with a different gauge of wire.

4. The knotter assembly of claim 1, wherein the knotter cover is attached to a first end of the first and second cover arms and the first and second cover arms are rotatable about a second end thereof to engage a ratchet assembly proximate to the second ends and configured to retain the first and second cover arms in a raised rotated position, and wherein rotation of the first and second cover arms about their second ends causes the knotter cover to at least partially extend from the first side of the knotter assembly.

5. The knotter assembly of claim 4, wherein the raised rotated position is approximately 60 degrees from vertical.

6. The knotter assembly of claim 4, wherein rotation of the first and second cover arms about their second ends provides access to and allows removal of the twist-module assembly via the first side of the knotter assembly.

7. A knotter assembly in a wire-tying system of a baler, the assembly comprising:
   a base plate;
   a pair of parallel opposed side walls each having a first edge, the first edges together defining a first side of the knotter assembly, each of said sidewalls including a mounting area;
   a guide mechanism on each side wall and extending inwardly therefrom;
   a torque tube assembly disposed between the side walls, the torque tube assembly including a torque tube, a cutter-assembly-actuating component fixably associated with the torque tube, a gripper-assembly-actuating component fixably associated with the torque tube, and a first and second operator member fixably attached to the torque tube, the first operator member including components for actuating-a first cover arm, the first cover arm being coupled with a knotter cover, and the second operator member including components for actuating a second cover arm, the second cover arm being coupled with the knotter cover, the first and second operator members actuating the first and second cover arms to cause the first and second cover arms and the knotter cover to at least partially extend from the first side of the knotter assembly; and
   a twist-module assembly removeably secured to the first side of the knotter assembly by securing bolts to said mounting areas, said twist module assembly is removable as a unit via the first side of the knotter assembly, the twist-module assembly including a modular housing having spaced-apart guide structures to guide said housing into and out of said side walls, said guide structures and said guide mechanisms cooperating to hold said twist module assembly in place between said side walls when said bolts are removed from said mounting areas; said housing having the cutter assembly, a twister pinion, pair of pinion bushings, and a pair of wire guides removeably mounted to the modular housing;
   wherein said twist module assembly can be removed as a unit by an operator after said bolts are removed from said mounting areas, aided by said guide structures and guide mechanisms.

8. A knotter assembly in a wire-tying system of a baler, the assembly comprising:
- a base plate;
- a pair of parallel opposed side walls each having a first edge, the first edges together defining a first side of the knotter assembly, each of said sidewalls including a mounting area;
- a guide mechanism associated with each side wall;
- a torque tube assembly disposed between the side walls, the torque tube assembly including a torque tube, a cutter-assembly-actuating component fixably associated with the torque tube, a gripper-assembly-actuating component fixably associated with the torque tube, and a first and second operator member fixably attached to the torque tube, the first operator member including components for actuating-a first cover arm, the first cover arm being coupled with a knotter cover, and the second operator member including components for actuating a second cover arm, the second cover arm being coupled with the knotter cover, the first and second operator members actuating the first and second cover arms to cause the first and second cover arms and the knotter cover to at least partially extend from the first side of the knotter assembly; and
- a twist-module assembly removeably secured to the first side of the knotter assembly at said mounting areas, said twist module assembly is removable as a unit via the first side of the knotter assembly, the twist-module assembly including a modular housing having spaced-apart guide structures to guide said housing into and out of said side walls, said guide structures and said guide mechanisms cooperating to hold said twist module assembly in place between said side walls when said twist module assembly is not secured to said mounting areas; said housing having the cutter assembly, a twister pinion, pair of pinion bushings, and a pair of wire guides removeably mounted to the modular housing;
- wherein said twist module assembly can be removed as a unit by an operator when said twist module assembly is not secured to said mounting areas, aided by said guide structures and guide mechanisms.

* * * * *